(12) United States Patent
Kwon et al.

(10) Patent No.: US 11,319,032 B2
(45) Date of Patent: May 3, 2022

(54) ACCOMMODATION LADDER FIXING DEVICE FOR PILOT

(71) Applicant: KOREA OCEAN TECH CO., LTD., Busan (KR)

(72) Inventors: Ki Seng Kwon, Busan (KR); Kang Min Kwon, Busan (KR); Kwang Hyun Cheong, Busan (KR)

(73) Assignee: KOREA OCEAN TECH CO., LTD., Busan (KR)

( * ) Notice: Subject to any disclaimer, the term of this patent is extended or adjusted under 35 U.S.C. 154(b) by 195 days.

(21) Appl. No.: 16/763,982

(22) PCT Filed: Oct. 25, 2018

(86) PCT No.: PCT/KR2018/012726
§ 371 (c)(1),
(2) Date: May 13, 2020

(87) PCT Pub. No.: WO2019/093697
PCT Pub. Date: May 16, 2019

(65) Prior Publication Data
US 2020/0391829 A1    Dec. 17, 2020

(30) Foreign Application Priority Data
Nov. 13, 2017    (KR) .......................... 10-2017-015804

(51) Int. Cl.
*H01F 7/02*      (2006.01)
*B63B 27/14*     (2006.01)
(Continued)

(52) U.S. Cl.
CPC .............. *B63B 27/146* (2013.01); *F16B 1/00* (2013.01); *H01F 7/02* (2013.01); *B63B 2221/00* (2013.01);
(Continued)

(58) Field of Classification Search
CPC ..... B63B 27/146; B63B 2221/00; F16B 1/00; F16B 2001/0035; H01F 7/02; F16H 1/14; F16H 25/2204
See application file for complete search history.

(56) References Cited

U.S. PATENT DOCUMENTS 3,604,532 A * 9/1971 Moore .................... B63B 27/14
                                                      182/127

FOREIGN PATENT DOCUMENTS

| JP | 05-294281 A | 11/1993 |
| JP | 06-179394 A | 6/1994 |

(Continued)

OTHER PUBLICATIONS

International Search Report of PCT/KR2018/012726 published on May 16, 2019.
Written Opinion of PCT/KR2018/012726 published on May 16, 2019.

*Primary Examiner* — Stephen P Avila

(57) ABSTRACT

The objective of the present invention is to provide an accommodation ladder fixing device, which more firmly and safely fixes, to an exterior wall of a ship, an accommodation ladder temporally provided so as to allow pilots to safely board and disembark the ship. That is, the present invention comprises: a housing (10), which has a fixing plate (13) formed at the rear end thereof to be mounted on the accommodation ladder (100), has a fixing box (11), of which the front side is opened, formed on the fixing plate (13), and has hinge shafts (15) formed at both sides of a through-hole (14) of the fixing box (11); an attachment/detachment means (20), which has a movable block (21) insertively provided so as to be movable forward and rearward to/from the fixing box (11), and a magnetic member (22) attached/detached to/from the exterior wall of a hull (200) and provided at the front end of the movable block.

6 Claims, 9 Drawing Sheets

(51) Int. Cl.
*F16B 1/00* (2006.01)
*F16H 25/22* (2006.01)
*F16H 1/14* (2006.01)

(52) U.S. Cl.
CPC ........ *F16B 2001/0035* (2013.01); *F16H 1/14* (2013.01); *F16H 25/2204* (2013.01)

(56) References Cited

FOREIGN PATENT DOCUMENTS

| KR | 10-2012-0132168 A | 12/2012 |
| KR | 10-2013-0118473 A | 10/2013 |
| KR | 10-2014-0018617 A | 2/2014 |

* cited by examiner

ACCOMMODATION LADDER FIXING DEVICE FOR PILOT

TECHNICAL FIELD

The present invention relates to an accommodation ladder fixing apparatus for fixing, to the hull of a ship, an accommodation ladder (or gangway) through which a pilot who safely guides the ship to a dock safely boards or leaves the ship when the ship enters a harbor.

BACKGROUND ART

International Maritime Organization (IMO) obligatorily enforces a port state control in each country to fix an accommodation ladder for a ship to a hull and to check whether the accommodation ladder has been installed at a main ship according to the Safety Of Life at Sea (SOLAS) agreement and a ship safety law in each country as measures for preventing a possible falling, missing, death or injury of a pilot from a pilot ladder upon rough sea or when it rains or winds in order to help a main ship captain to have the ship to safely enter and leave the port when the ship enters and leaves a port.

When a ship enters or leaves a port, pilots who are well aware of details, such as terrain features, a tidal current, the height of a wave and the wind in the corresponding port, board a main ship and obligatorily help the embarkation and disembarkation tasks of main ship captains of the ship because the main ship captains are unaware of the details in the corresponding port.

The pilots may move to the main ship using a dedicated small-sized boat for a pilot, may go up to a given height using a pilot ladder provided in the main ship, and may climb onto a deck in the main ship using an accommodation ladder or may directly climb onto a deck in the main ship using an accommodation ladder from a pilot boat.

However, although such a ladder is used, if weather conditions, such as that when there are waves or when it rains and winds together, are not good, a hull is severely shaken due to the rolling or pitching of the hull when a pilot gets on or leaves a ship. Accordingly, pilots fall or die or are missed or injured while they get on or leave a ship. According to the data of the IMO, a considerable number of pilots are dead or injured every year worldwide. In order to solve such a problem, the IMO has adopted a technology for preventing a loss of lives through agreements, and has made all ships in the world to compulsorily install ladders for a ship, which satisfy such technical criteria.

Furthermore, even in Korea, the use of the ladder was mandatory according to the Boat Safety Act. Accordingly, the inventor of the present invention proposed a technology for attaching a pilot ladder for a pilot to a ship as disclosed in Korean Patent No. 1412215, but a technology or equipment that satisfies an international standard or agency approval related to the technology for fixing an accommodation ladder to a hull is not present.

PRIOR ART DOCUMENT (Patent Document 1) KR 10-1412215 B1 (2014 Jun. 19)

DISCLOSURE

Technical Problem

Accordingly, the present invention has been made to solve general problems occurring in the prior art and an object of the present invention is to provide an accommodation ladder fixing apparatus for a pilot, which is configured to easily fix or detach, to or from a hull, an accommodation ladder through which a pilot can safely board a ship even in a condition in which the rolling and pitching of the ship is severe, can rapidly operate in a firm state, can be economically fabricated, and can secure crewmen's safety.

Furthermore, the present invention provides an accommodation ladder fixing apparatus, which enables an accommodation ladder to be fixed and moved at the same time using a side roller attached to a main apparatus upon movement up and down in order to install the accommodation ladder.

Technical Solution

As means for solving the object of the present invention more specifically, in constructing an accommodation ladder fixing apparatus for attaching an accommodation ladder to an outer wall of a hull, the accommodation ladder fixing apparatus includes a housing in which a fixing plate is positioned in a rear end of the housing in such a way as to be mounted on the accommodation ladder, a fixing box having an open front side is positioned in the fixing plate, and hinge shafts are disposed on both sides of a through hole of the fixing box; detachment/attachment means comprising a movable block inserted into the fixing box to move forward or backward and a magnetic member positioned at a front end of the movable block and attached or detached to and from the outer wall of the hull; and an operation member connected to the movable block to drive the movable block forward and backward and positioned to penetrate the fixing box of the housing, wherein the magnetic member comprises a variable permanent magnet provided in the front of the movable block and a rotatable lever making on/off magnetism of the variable permanent magnet.

Furthermore, the operation member includes a movable shaft positioned to penetrate the inside and outside of the movable block on both sides of the movable block, and an operation lever axially installed in the hinge shaft of the fixing box and coupled to the movable shaft of the movable block to move the movable block forward and backward. A handle is formed at the top of the operation lever. A bar-shaped operation mechanism is integrated with the lower side of the handle. An upper long-hole and lower long-hole are formed on the upper and lower sides of the operation mechanism. The upper long-hole is axially installed in the hinge shaft so that the operation lever moves forward and backward by a shaft pin. The lower long-hole is confined and coupled to the movable shaft to move the movable block forward and backward. Elastic springs are disposed between the shaft pin and the operation mechanism on both sides of the operation mechanism in such a way as to elastically support an up and down operation of the operation lever.

Furthermore, an insertion part is protruded at the bottom of the operation mechanism of the operation lever. A forward fixing hole and backward fixing hole are formed at front and rear ends under the fixing box. When the movable block is driven by the operation lever, the insertion part at the bottom of the operation mechanism is inserted into the forward fixing hole or the backward fixing hole to fix the operation lever, and the movable block is configured to maintain or limit the state in which the movable block moves forward and backward in the fixing box.

Furthermore, slide long-holes are formed on both sides of the fixing box. Both ends of the movable shaft are protruded and engaged with the slide long-holes of the fixing box to limit a forward or backward movement distance of the movable block by the operation lever so that a maximum degree of protrusion of the magnetic member is limited.

Furthermore, a ball screw is screwed onto the operation member to penetrate the operation member in the middle of the movable block. A driven gear is positioned at the end of the ball screw. A driving gear is geared with the driven gear at a right angle. A handle shaft is coupled to penetrate the top of the driving gear and the fixing box. A rotatable handle is configured at a top of the handle shaft. When the rotatable handle is held and the handle shaft is rotated, the driving gear and the driven gear are electrically driven at a right angle to increase or decrease a degree of exposure of the magnetic member.

Furthermore, support brackets are positioned on both sides under the fixing box. A roller guide in which a side roller is positioned between the front ends of the support brackets is further provided.

Advantageous Effects

According to the detailed means for solving the objects, the following effects are obtained.

① Safety can be highly improved even without changing the entire construction of an accommodation ladder because the accommodation ladder is firmly fixed by positioning, under the accommodation ladder, the fixing apparatus of a relatively simple structure having the variable permanent magnet.

② Fine adjustment for the variable permanent magnet is conveniently performed at a given interval by the driving handle. Accordingly, there is a great effect in that convenience and safety can be improved upon installation because a ladder for a pilot can be always fixed at a precise location in accordance with location requirements for a hull.

③ The magnetization function (magnet on) and release (magnet off) functions of the variable permanent magnet are conveniently performed by a simple rotatable manipulation of the driving handle 10 that turns the rotatable shaft. Accordingly, use is convenient because an accommodation ladder can be attached or detached from a hull very conveniently.

④ When a ship enters or leaves a port, a boat for a pilot, a hull, an accommodation ladder, and a ladder for a pilot independently move because they are not firmly united. Embarkation and disembarkation safety can be doubled if the boat for a pilot and the hull (ladder and accommodation ladder for a pilot) have only to be moved using the accommodation ladder fixing apparatus.

BEST MODE FOR INVENTION

Hereinafter, detailed contents for implementing the present invention are described with reference to the accompanying drawings.

Figure 1:
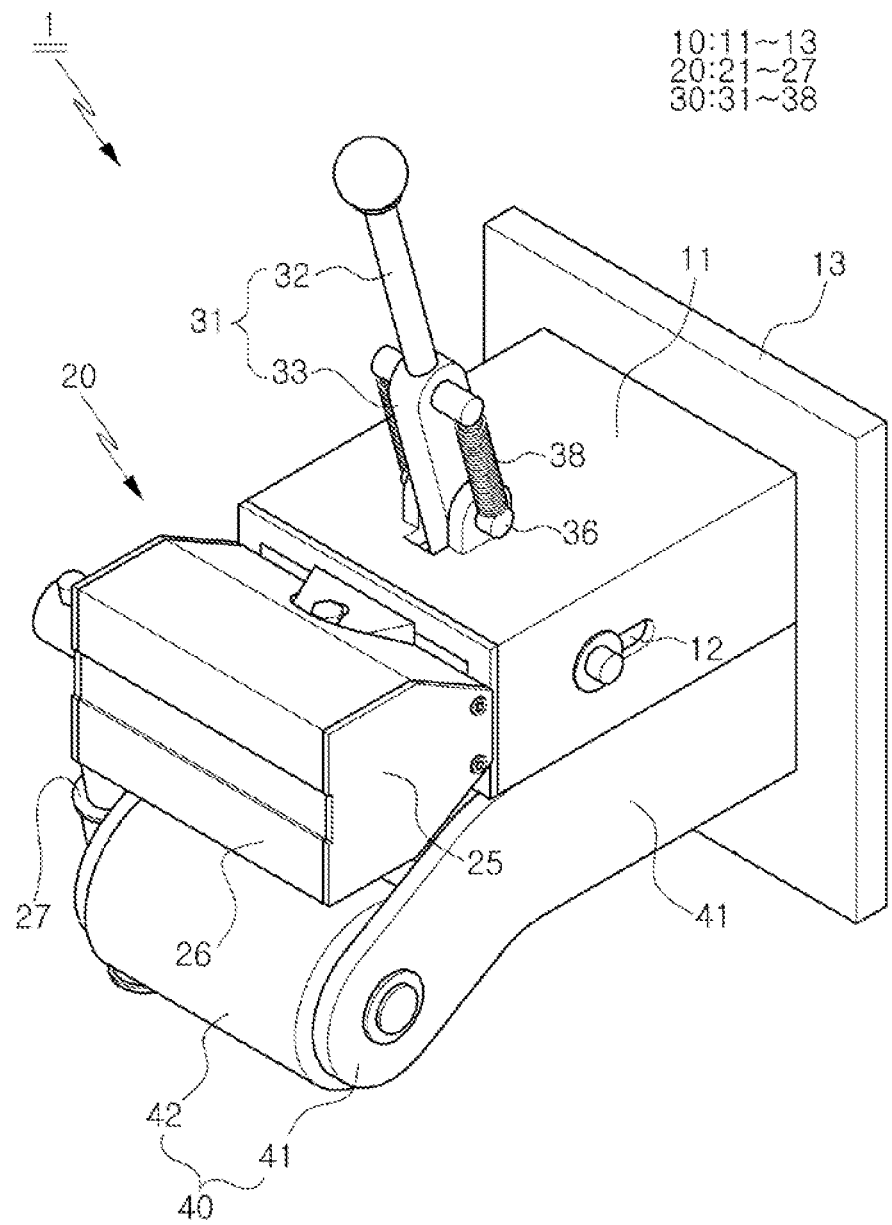
FIG. 1 is a perspective view showing an accommodation ladder fixing apparatus for a pilot according to the present invention.
Figure 2:
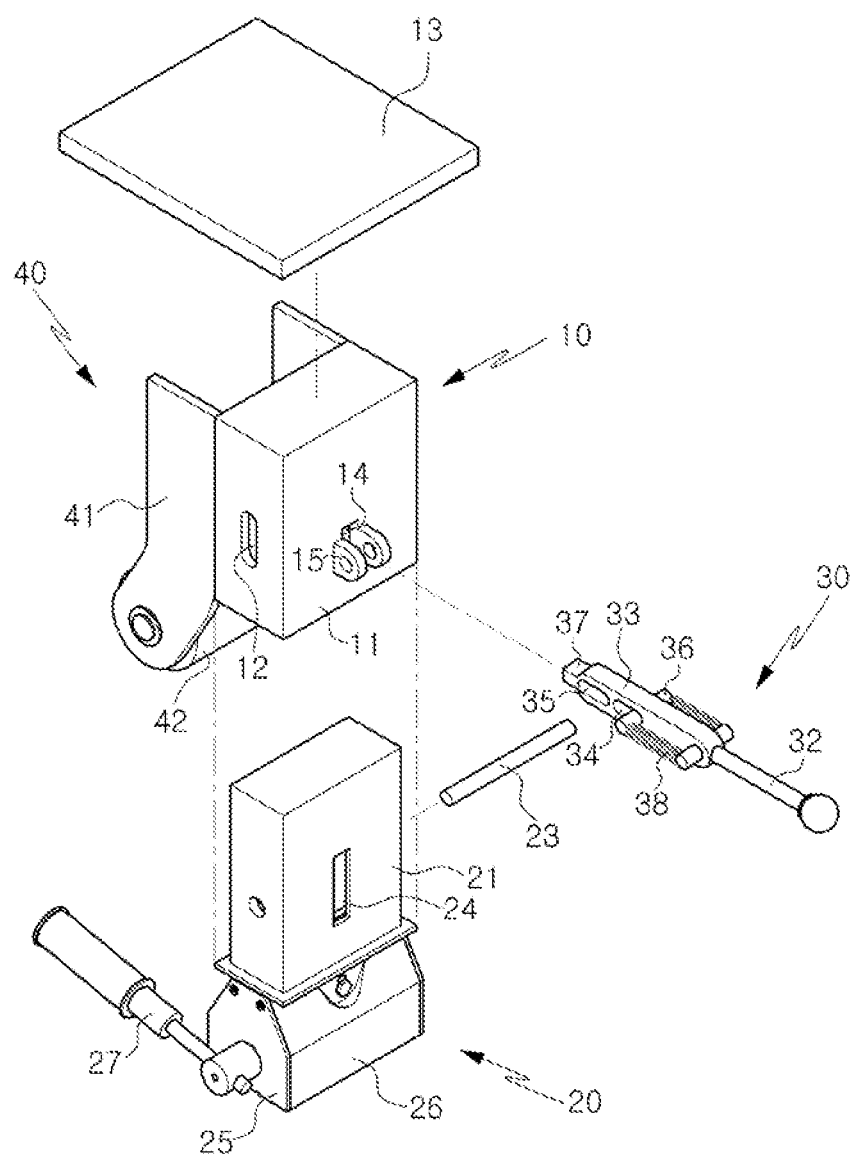
FIG. 2 is a separated perspective view showing the accommodation ladder fixing apparatus for a pilot according to the present invention.
Figure 3:
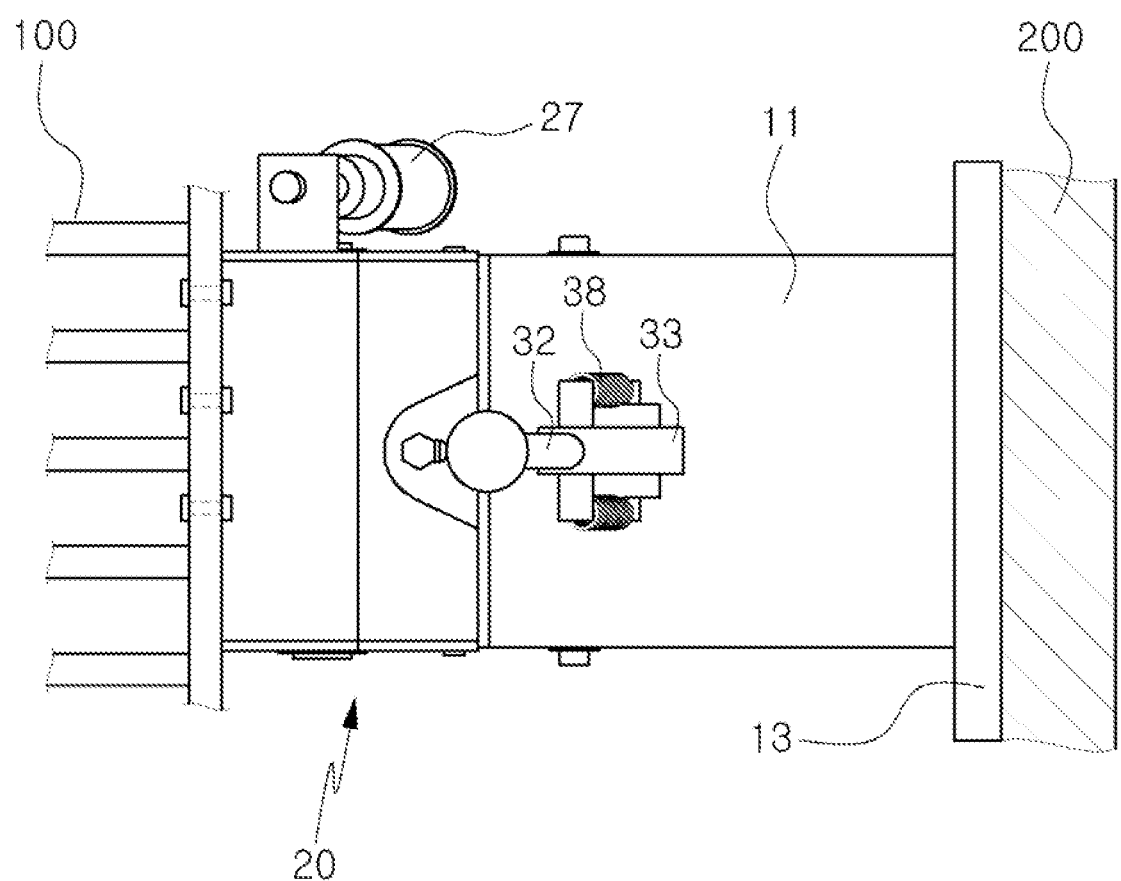
FIG. 3 is a plan view of FIG. 1.

FIG. 1 is a perspective view showing an accommodation ladder fixing apparatus for a pilot according to the present invention. FIG. 2 is a separated perspective view showing the accommodation ladder fixing apparatus for a pilot according to the present invention. FIG. 3 is a plan view of FIG. 1.

The accommodation ladder fixing apparatus 1 of the present invention is installed on the side of an accommodation ladder 100 installed in the outer wall of a hull along with a pilot ladder so that a pilot boards a shop on which the accommodation ladder has been installed. The present invention provides the accommodation ladder fixing apparatus 1 to which the accommodation ladder 100 can be stably fixed without being shaken by being firmly attached to a hull 200.

The fixing apparatus 1 includes a housing 10 coupled to the accommodation ladder 100, detachment/attachment means 20 installed in the housing 10 to operate forward and backward and attached or detached to or from a hull, and an operation member 30 installed in the housing 10 to move the detachment/attachment means 20 forward and backward.

Meanwhile, the fixing apparatus 1 may further include a roller guide unit 40 configured to neighbor the outer wall of the hull 200 under the housing 10 to easily move up and down and to stably support an operation of the detachment/attachment means 20. The roller guide unit 40 has an effect in that it prevents a hull from being damaged by the magnetic member 22 when the accommodation ladder is installed in the hull or uninstalled from the hull.

The housing 10 includes a fixing box 11 having an open front side. Slide long-holes 12 by which the detachment/attachment means 20 guides a forward and backward operation and limits a forward and backward distance are formed on both sides of the fixing box 11. A fixing plate 13 coupled to the accommodation ladder 100 is integrated with the back of the fixing box 11.

Furthermore, a through hole 14 for the installation of the operation member 30 is formed on the upper side of the fixing box 11. Hinge shafts 15 are formed on both sides of the through hole 14. A forward fixing hole 16 and backward fixing hole 17 are formed at front and rear ends at the bottom of the fixing box 11 and are inserted into the bottom of the operation member 30.

The detachment/attachment means 20 includes a movable block 21 that moves forward or backward within the fixing box 11, and includes a magnetic member 22 positioned at the front end of the movable block 21.

The movable block 21 includes a movable shaft 23 that penetrates the inside and outside of the movable block on both sides thereof. Both ends of the movable shaft 23 are protruded in such a way to be engaged with the slide long-holes 12 of the fixing box 11 to limit the forward or backward movement distance of the movable block 21, thus limiting a maximum degree of protrusion of the magnetic member 22.

Furthermore, through holes 24 and 24" through which the operation member 30 penetrates are formed at the top and bottom of the movable block 21.

The magnetic member 22 includes a pair of side plates 25 disposed on both sides of the movable block 21 at the front thereof. A variable permanent magnet 26 is positioned between the side plates 25. A rotatable lever 27 for making on/off magnetism of the variable permanent magnet 26 is positioned in the side plate 25 on one side.

Meanwhile, when the rotatable lever 27 rotates, the variable permanent magnet 26 generates or loses magnetism, so the magnetic member 22 closely attaches or detaches the accommodation ladder 100 to or from the hull 200.

A technology for generating or losing magnetism by the operation of the rotatable lever 27 is a known technology applied in several industrial fields, and a description of a detailed construction thereof is omitted.

Furthermore, the intensity of magnetism of the variable permanent magnet 26 used as a fixing apparatus needs to be calculated as a condition in which the variable permanent magnet can safely withstand the rolling of a ship within 8 seconds when the ship rolls once from a period portside to a starboard at a rolling degrees of 15.

Furthermore, an installation location and capacity need to be calculated so that the magnetism is greater than a value in which a safety ratio has been taken into consideration in a total load of the weights of a pilot and the accommodation ladder 100.

The operation member 30 is positioned on the upper side of the housing 10 in such a way to penetrate the fixing box 11 and the movable block 21. The operation member 30 includes an operation lever 32 axially positioned in the hinge shaft 15 of the fixing box 11 and coupled to the movable shaft 23 of the movable block 21 in such a way as to operate front and back and up and down and move the movable block 21 forward and backward.

A handle 32 is formed at the top of the operation lever 31. A bar-shaped operation mechanism 33 is integrated with the bottom of the handle 32. An upper long-hole 34 and lower long-hole 35 are formed in the upper and lower sides of the operation mechanism 33. The upper long-hole 34 is axially positioned in the hinge shaft 15 in such a way as to be rotated by a shaft pin 36. The lower long-hole 35 is coupled to the movable shaft 23 in such a way as to be confined in the movable shaft 23.

Furthermore, an insertion part 37 is protruded at the bottom of the operation mechanism 33 and inserted into the forward fixing hole 16 and backward fixing hole 17 of the fixing box 11 to fix the operation lever 31, thus limiting an operation of the movable block 21.

Furthermore, elastic springs 38 and 38" are disposed between the shaft pin 36 and operation mechanism 33 axially positioned in the hinge shaft 15 on both sides of the operation mechanism 33, thus elastically supporting an up and down operation of the operation lever 31.

The roller guide 40 includes support brackets 41 positioned on both sides under the fixing box 11 and includes a roller 42 between the front ends of the support bracket 41.

Figure 4:
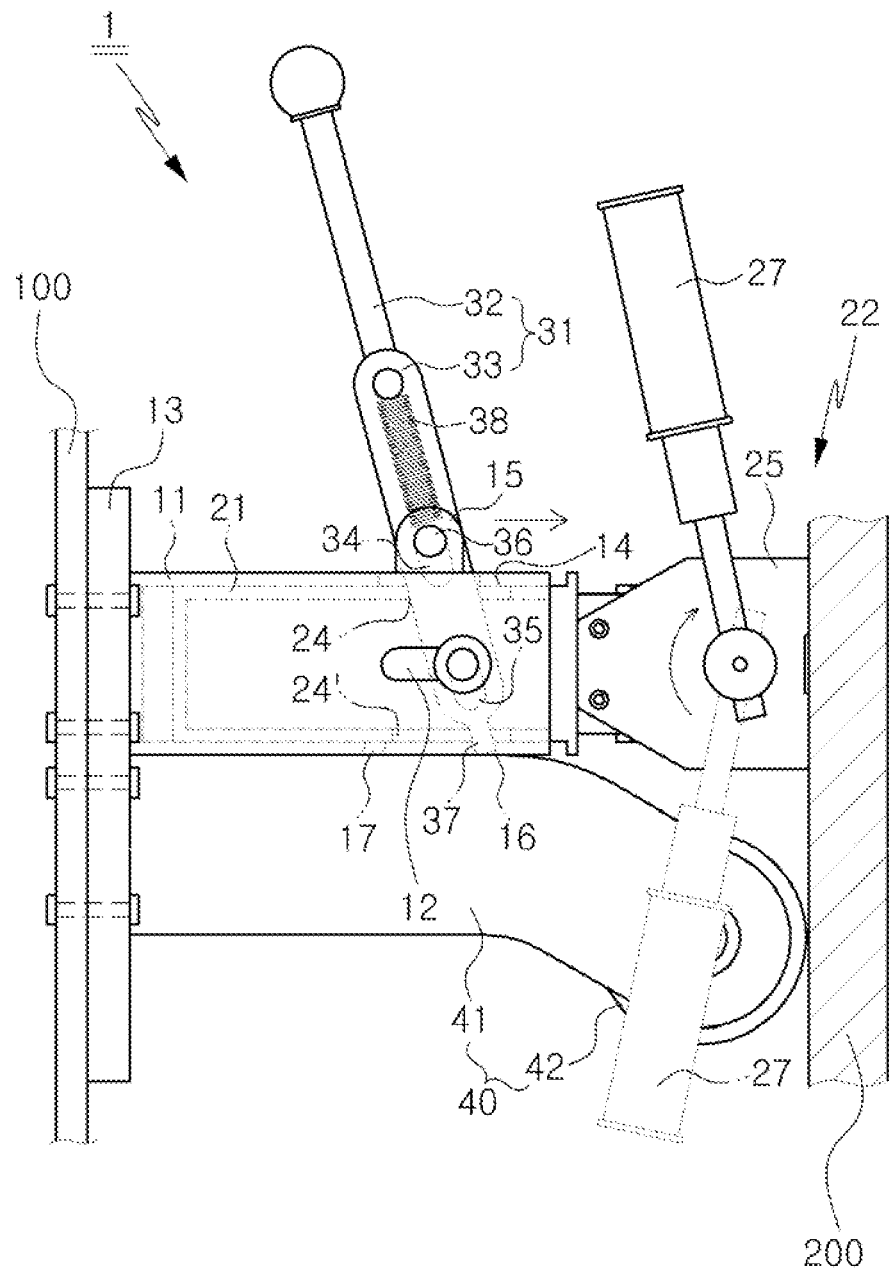
FIG. 4 is a use state diagram of FIG. 2.

In the construction of the present invention, as shown in FIG. 4, the accommodation ladder 100 is fixed to an outer hull of a large-sized ship using the principle of the magnetic member 22 whose magnetism becomes on/off by an operation of the rotatable lever 27. The fixing apparatus 1 is installed at a side frame portion under the accommodation ladder 100.

That is, in a method of fixing the fixing apparatus 1, the fixing plate 13 is simply mounted on the side frame of the accommodation ladder 100 or a proper location of a lower foothold using a bolt or nut.

An operation of the accommodation ladder fixing apparatus 1 for a pilot according to the present invention is described below.

Figure 6:
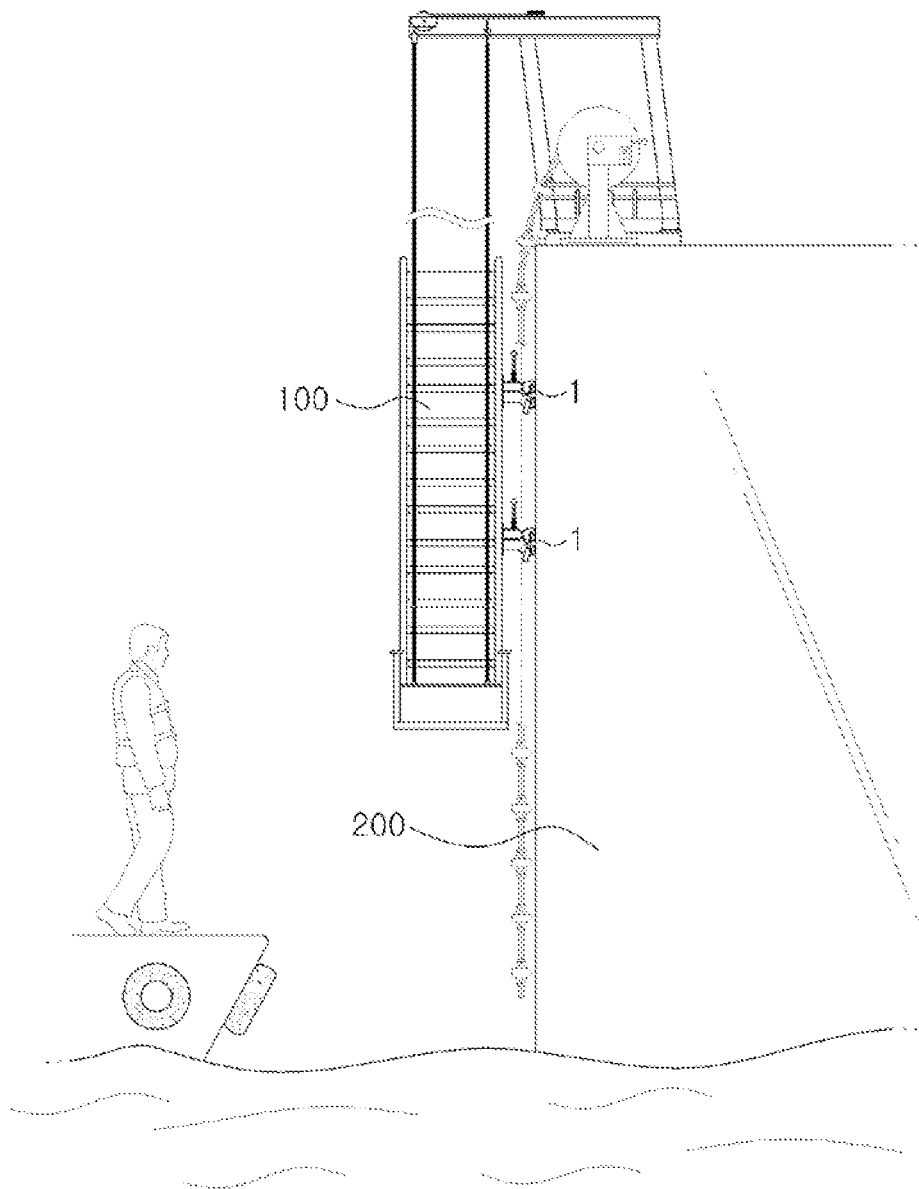
FIG. 6 is a use state diagram showing an example right before a pilot boards a ship.
Figure 7:
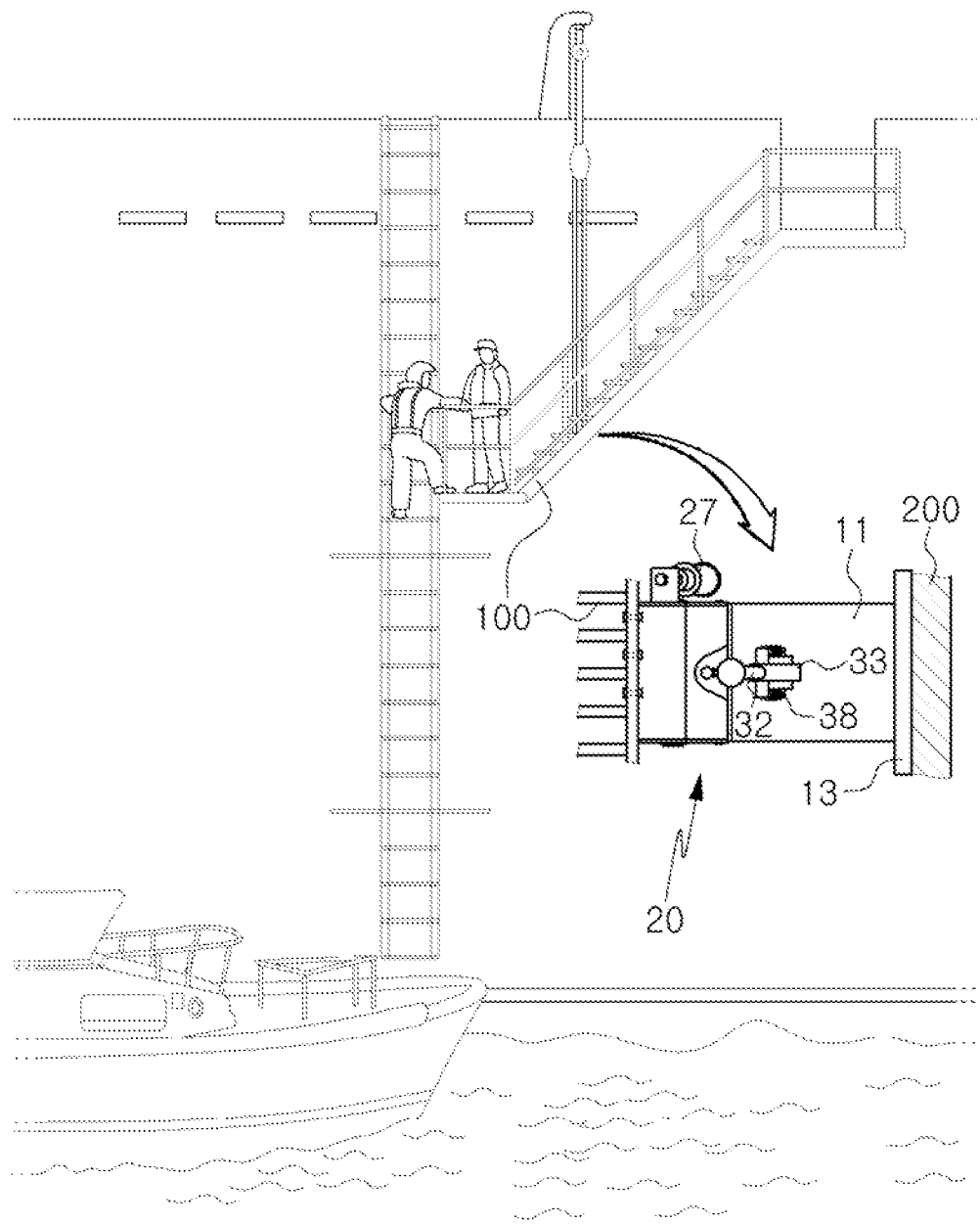
FIG. 7 is a diagram showing the state in which a pilot boards a ship using a ladder.

Referring to FIGS. 6 to 7, when a pilot ladder for a pilot and the accommodation ladder 100 are installed so that a pilot approaches a main ship using a pilot boat and boards a ship, the ladder for a pilot is manually hung down to the outer wall of the hull 200 and the accommodation ladder 100 is hung down to the outer wall of the hull 200 using a winch. In a task process of installing the accommodation ladder 100, the rotatable lever 27 of the magnetic member 22 is placed at a magnetism release location.

When the installation location is determined, the magnetic member 22 of the fixing apparatus 1 is attached to the outer wall of the hull and fixes the accommodation ladder 100.

At this time, the fixing apparatus 1 is protruded to advance the movable block 21 and simultaneously advance the magnetic member 22 to be closely attached to the outer wall of the hull 200 by manipulating the operation member 30.

In this case, in an operation of the movable block 21 by the operation lever 32, the movable block 21 performs a forward and backward operation by pushing and pulling front and back the handle while the handle is upward pulled.

Figure 5:
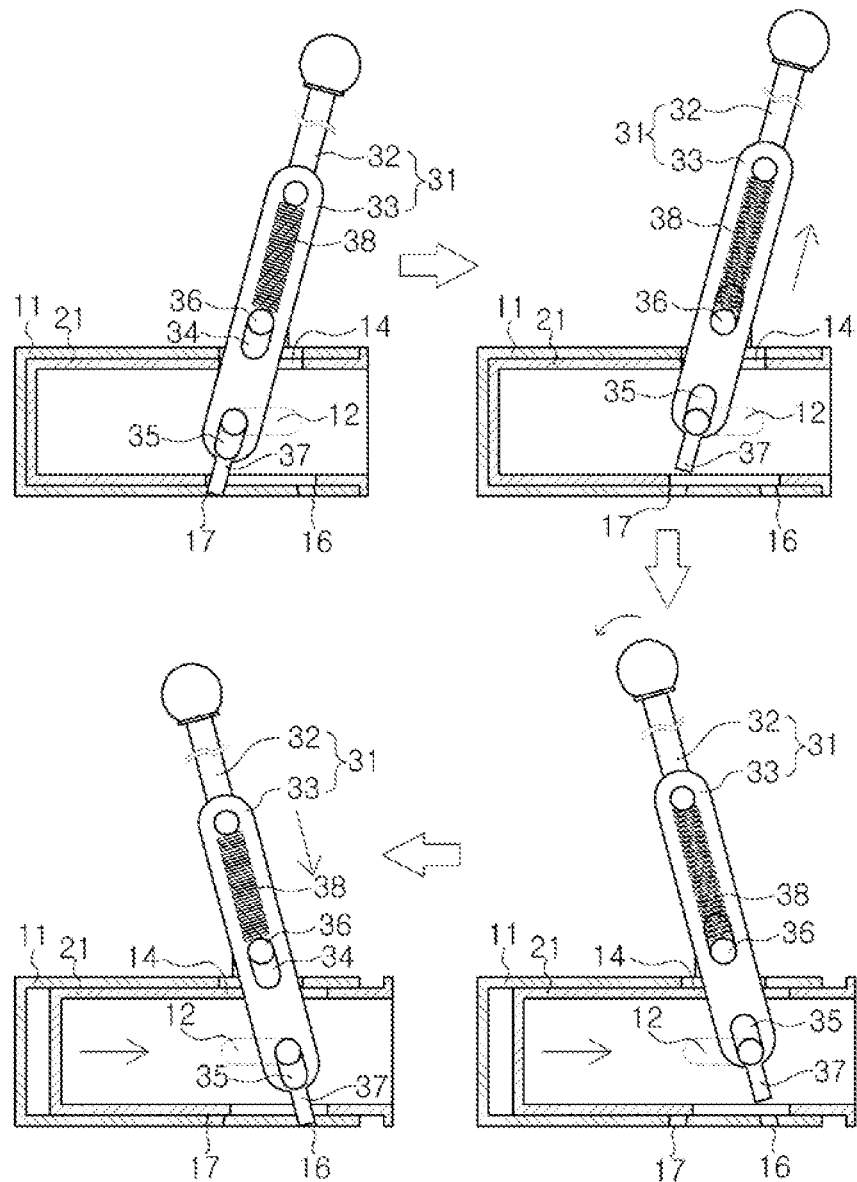
FIG. 5 is a diagram showing an operation example of FIG. 4.

That is, referring to FIG. 5, when the handle 32 is backward pulled in the state in which the handle has been upward pulled, the operation mechanism 33 moves forward, and the movable block 21 moves forward by the movable shaft 23 confined by the operation mechanism 33 and then protrudes from the fixing box 11.

In contrast, when the handle 32 is pushed to the front side in the state in which the handle has been upward pulled, the operation mechanism 33 moves back, and thus the movable block 21 is moved backward by the movable shaft 23 fixed to the operation mechanism 33 and inserted into the fixing box 11.

At this time, the degree that the movable block 21 is protruded to a maximum is limited as both ends of the movable shaft 23 penetrate the slide long-hole 12 of the fixing box 11 and are engaged therewith.

Furthermore, when the handle 32 is placed after the movable block 21 is moved forward and backward in the state in which the handle 32 has been upward pulled, the handle 32 drops down by a restoration force of the elastic spring 38 coupled between the top of the operation mechanism 33 and the shaft pin 36. At the same time, the insertion part 37 at the bottom of the operation mechanism 33 is inserted into the forward fixing hole 16 or the backward fixing hole 17 to fix the operation lever 31. Accordingly, the movable block 21 maintains a fixed state without moving.

When the magnetic member 22 approaches the hull 200, the magnetic member 22 is strongly adsorbed to the outer wall of the hull by magnetism generated by turning the rotatable lever 27 of the magnetic member 22. Accordingly, the fixing of the accommodation ladder 100 is completed.

Accordingly, the safe embarkation of a pilot can be guaranteed even in a condition in which the rolling of a ship is severe in a bad weather in the state in which the accommodation ladder 100 has been firmly fixed as described above.

The movable block 21 can be moved forward and backward and the distance of the magnetic member 22 can be finely adjusted by a simple manipulation of the operation member 30 as described above. Accordingly, the accommodation ladder 100 installed in the hull 200 inevitably has a separation space between the side of the hull 200 and the accommodation ladder 100. A total length of the fixing apparatus 1 needs to be longer than the separation space D when the fixing apparatus 1 of the present invention is positioned in the separation space D.

The reason for this is that when the length of the fixing apparatus is equal to or greater than the separation space D, the magnetic member 22 interferes with an outer wall of the hull 200, damages the hull 200, and cause a failure of the fixing apparatus 1 because the fixing apparatus 1 continues to be attached to the ladder forward and to move along with the ladder if the fixing apparatus 1 suitable for a designed location and capacity is calculated and installed in the accommodation ladder 100.

Accordingly, in order to compensate for such a gap, that is, a difference between the separation space D and the length of the fixing apparatus 1, in the present invention, the operation member 30 is configured to be exposed to the outside of the fixing box 1 and is manipulated forward and backward. Accordingly, the movable block 21 is configured to move inward or outward so that the exposure range of the magnetic member 22 can be finely adjusted. Accordingly, when the fixing apparatus 1 of the present invention is installed in the accommodation ladder 100, the magnetic member 22 is further protruded by the operation lever 32 and thus stably comes into contact with the outer wall of the hull 200 without a movement attributable to the gap.

If the accommodation ladder fixing apparatus 1 for a pilot according to the present invention is used, first, the fixing apparatus 1 having a structure in which the variable permanent magnet 26 has been positioned under a ladder for guiding the embarkation of a pilot has only to be simply installed in the side plate or foothold of the accommodation ladder 100. Accordingly, the accommodation ladder fixing apparatus 1 can be installed at a low cost, and safety can be highly improved even without greatly changing an overall construction of a ladder. Second, the fine adjustment of the variable permanent magnet 26 can be conveniently performed at a given interval by the forward and backward driving of the operation lever 32. Accordingly, the accommodation ladder fixing apparatus 1 can be applied to all ships having an irregular interval between the hull 200 and a ladder, and can be always fixed at a home position.

Furthermore, the magnetization function and release function of the variable permanent magnet 26 configuring the magnetic member 22 are conveniently performed by a simple rotatable manipulation of the rotatable lever 27. Accordingly, there is an advantage in use because the accommodation ladder 100 can be installed or uninstalled very conveniently.

Meanwhile, the on/off of magnetism of the magnetic member 22 of the present invention has been illustrated as be regulated by the rotatable lever 27 using the variable permanent magnet 26. However, a person skilled in the art may easily implement that an electromagnet is installed instead of the variable permanent magnet 27, a wire for applying power to the electromagnet is installed along a ladder frame, and a control unit for supplying power to the electromagnet through a controller for controlling a winch positioned on a deck and regulating the power. Furthermore, the on/off of the magnet may be performed using an air control function.

Mode for Invention

Figure 8:
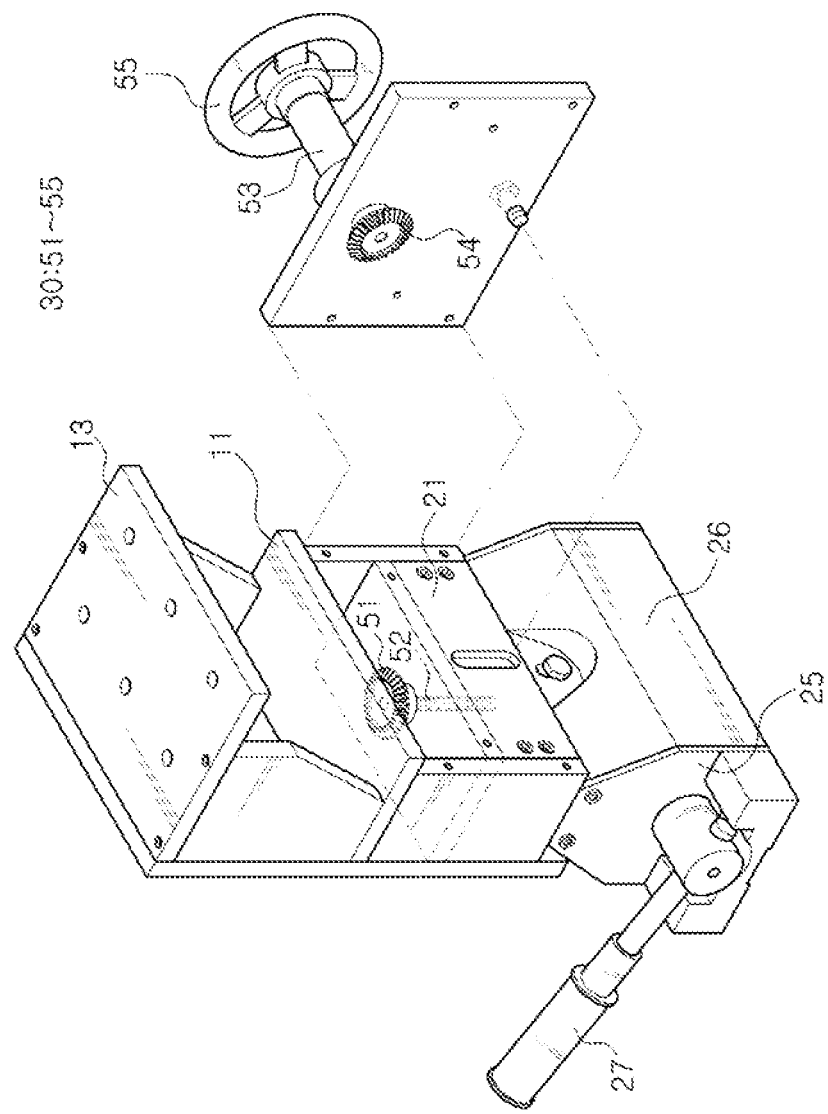
FIG. 8 is a separated perspective view showing another embodiment of an accommodation ladder fixing apparatus for a pilot according to the present invention.
Figure 9:
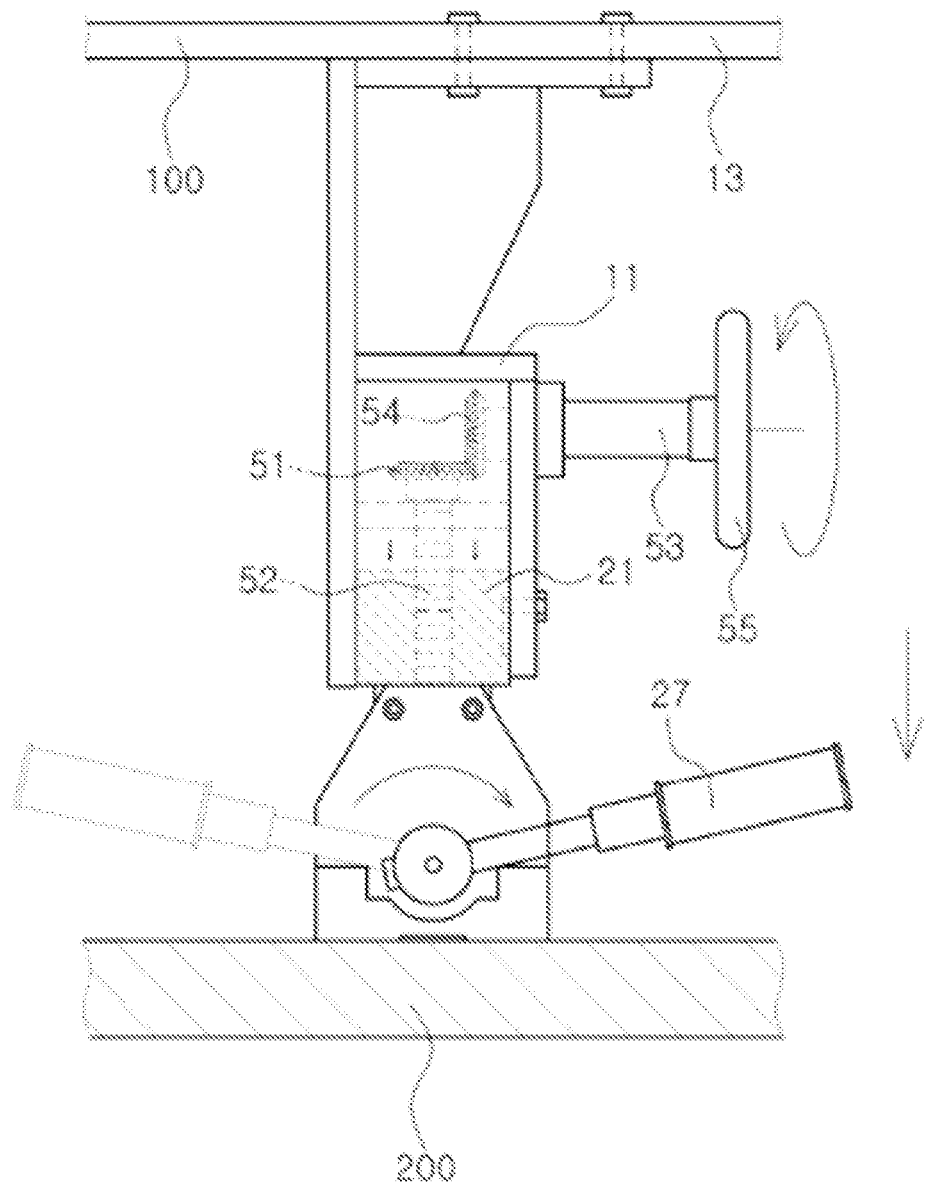
FIG. 9 is a side cross-sectional view showing a coupling state and operation example of FIG. 8.

FIG. 8 is a separated perspective view showing another embodiment of an accommodation ladder fixing apparatus for a pilot according to the present invention. FIG. 9 is a side cross-sectional view showing a coupling state and operation example of FIG. 8.

In the accommodation ladder fixing apparatus 1 for a pilot according to the present invention, the operation member 30 for driving the detachment/attachment means 20 may be modified to operate in a gear-driven manner.

To this end, a ball screw 52 having a driven gear 51 mounted on its end is screwed and coupled to the middle of the movable block 21. When the ball screw 52 is rotated by the driven gear S, the movable block 21 protrudes forward and the magnetic member 22 comes into contact with the hull 200. A driving gear 54 is positioned in a handle shaft 53 that penetrates the top of the fixing box 1 in the driven gear 51. When the handle shaft 53 is rotated with the rotatable handle 55 held, the driving gear 54 and the driven gear 51 are electrically driven at a right angle and configured to increase or decrease an exposure degree of the magnetic member 22.

Accordingly, when a rotatable handle 55 exposed to the outside of the fixing box 11 is rotated, the handle shaft 53 drives the gear, the ball screw 52 is rotated, and thus the movable block 21 screwed onto the ball screw moves inward or outward. Accordingly, a moving range of the magnetic member 22 can be adjusted more finely.

Furthermore, the rotatable handle 55 has been illustrated as being driven by a manual work of a deck worker. However, a motor may be axially coupled to the axis of the handle shaft 53 and the rotatable handle 55 and configured to be driven by electricity or air pressure so that the rotatable handle 55 is remotely controlled by a controller on a deck.

Meanwhile, although not illustrated, the operation member 30 may be modified to drive the movable block 21 using a cylinder driven by oil pressure not a gear-driven method or an actuator, such as a motor, which is installed within the fixing box.

Although the most preferred embodiment of the present invention has been described in the detailed description of the present invention as described above, the present invention may be variously modified without departing from the technical range of the present invention. Accordingly, the range of protection of the present invention should not be limited to the embodiment, but the technologies of the claims and equivalent technical means from these technologies should be recognized as the range of protection of the present invention.

INDUSTRIAL APPLICABILITY

The accommodation ladder fixing apparatus for a pilot according to the present invention can significantly increase safety when a pilot boards or leaves a ship by suppressing a movement by waves because the fixing apparatus firmly fixes the accommodation ladder of the ship, and can be widely applied to new shipbuilding in addition to the exiting shipbuilding because the fixing apparatus has a simple structure and can be easily installed.

What is claimed is:

1. An accommodation ladder fixing apparatus for a pilot in constructing the accommodation ladder fixing apparatus for attaching an accommodation ladder 100 to an outer wall of a hull 20, the fixing apparatus comprising:
    a housing 10 in which a fixing plate 13 is positioned in a rear end of the housing in such a way as to be mounted on the accommodation ladder 100, a fixing box 11 having an open front side is positioned in the fixing plate 13, and hinge shafts 15 are disposed on both sides of a through hole 14 of the fixing box 11;

detachment/attachment means 20 comprising a movable block 21 inserted into the fixing box 11 to move forward or backward and a magnetic member 22 positioned at a front end of the movable block 21 and attached or detached to and from the outer wall of the hull 200; and an operation member 30 connected to the movable block 21 to drive the movable block 21 forward and backward and positioned to penetrate the fixing box 11 of the housing 10, wherein the magnetic member 22 comprises a variable permanent magnet 26 provided in the front of the movable block 21 and a rotatable lever 27 making on/off magnetism of the variable permanent magnet 26.

2. The fixing apparatus of claim 1, wherein:

the operation member 30 comprises a movable shaft 23 positioned to penetrate an inside and outside of the movable block 21 on both sides of the movable block, and an operation lever 31 axially installed in a hinge shaft 15 of the fixing box 11 and coupled to the movable shaft 23 of the movable block 21 to operate front and rear and up and down and to move the movable block 21 forward and backward, a handle 32 is formed at a top of the operation lever 31, a bar-shaped operation mechanism 33 is positioned on a lower side of the handle 32, an upper long-hole 34 and lower long-hole 35 are formed on upper and lower sides of the operation mechanism 33, the upper long-hole 34 and the hinge shaft 15 are confined by a shaft pin 36 so that the operation lever 31 perform an angular motion, the lower long-hole 35 is confined and coupled to the movable shaft 23 to move the movable block 21 forward and backward, and elastic springs 38 and 38" are disposed between the shaft pin 36 and the operation mechanism 33 on both sides of the operation mechanism 33 in such a way as to elastically support an up and down operation of the operation lever 31.

3. The fixing apparatus of claim 2, wherein:

an insertion part 37 is protruded at a bottom of the operation mechanism 33 of the operation lever 3, a forward fixing hole 16 and backward fixing hole 17 are formed at front and rear ends under the fixing box 11, and when the movable block 21 is driven by the operation lever 31, the insertion part 37 at the bottom of the operation mechanism 33 is inserted into the forward fixing hole 16 or the backward fixing hole 17 to fix the operation lever 31, and the movable block 21 is configured to maintain or limit a state in which the movable block 21 moves forward and backward in the fixing box 11.

4. The fixing apparatus of claim 2, wherein:

slide long-holes 12 are formed on both sides of the fixing box 11, and both ends of the movable shaft 23 are protruded and engaged with the slide long-holes 12 of the fixing box 11 to limit a forward or backward movement distance of the movable block 21 by the operation lever 31 so that a maximum degree of protrusion of the magnetic member 22 is limited.

5. The fixing apparatus of claim 1, wherein:

a ball screw 52 is screwed onto the operation member 30 to penetrate the operation member 30 in a middle of the movable block 21, a driven gear 51 is positioned at an end of the ball screw 52, a driving gear 54 is geared with the driven gear 51 at a right angle, a handle shaft 53 is coupled to penetrate a top of the driving gear 54 and the fixing box 11, a rotatable handle 55 is configured at a top of the handle shaft 53, and when the rotatable handle 55 is held and the handle shaft 53 is rotated, the driving gear 54 and the driven gear 51 are electrically driven at a right angle to increase or decrease a degree of exposure of the magnetic member 22.

6. The fixing apparatus of claim 1, wherein:

support brackets 41 are positioned on both sides under the fixing box 11, and a roller guide 40 in which a side roller 42 is positioned between front ends of the support brackets 41 is further provided so that the roller guide comes into contact with the outer wall of the hull 200 to facilitate an up and down movement and prevent damage to the hull.

\* \* \* \* \*